United States Patent
Shum et al.

(10) Patent No.: US 8,250,336 B2
(45) Date of Patent: Aug. 21, 2012

(54) METHOD, SYSTEM AND COMPUTER PROGRAM PRODUCT FOR STORING EXTERNAL DEVICE RESULT DATA

(75) Inventors: Chung-Lung Kevin Shum, Wappingers Falls, NY (US); Brian D. Barrick, Pflugerville, TX (US); Thomas Koehler, Holzerlingen (DE); Aaron Tsai, Poughkeepsie, NY (US)

(73) Assignee: International Business Machines Corporation, Armonk, NY (US)

( * ) Notice: Subject to any disclaimer, the term of this patent is extended or adjusted under 35 U.S.C. 154(b) by 727 days.

(21) Appl. No.: 12/036,695

(22) Filed: Feb. 25, 2008

(65) Prior Publication Data

US 2009/0216966 A1    Aug. 27, 2009

(51) Int. Cl.
*G06F 13/00* (2006.01)

(52) U.S. Cl. .................................................. 711/215
(58) Field of Classification Search ................. None
See application file for complete search history.

(56) References Cited

U.S. PATENT DOCUMENTS

| | | | |
|---|---|---|---|
| 5,694,587 A | 12/1997 | Webb et al. | |
| 5,765,035 A | 6/1998 | Tran | |
| 6,009,516 A | 12/1999 | Steiss et al. | |
| 6,065,103 A | 5/2000 | Tran et al. | |
| 6,189,068 B1 | 2/2001 | Witt et al. | |
| 6,938,148 B2 | 8/2005 | Moore et al. | |
| 2002/0174253 A1* | 11/2002 | Hayter et al. | 709/250 |
| 2005/0027911 A1* | 2/2005 | Hayter et al. | 710/62 |
| 2006/0026371 A1* | 2/2006 | Chrysos et al. | 711/158 |
| 2006/0047849 A1* | 3/2006 | Mukherjee | 709/238 |
| 2006/0075301 A1* | 4/2006 | Fossum et al. | 714/38 |
| 2006/0143406 A1* | 6/2006 | Chrysos et al. | 711/143 |
| 2007/0050564 A1* | 3/2007 | Gunna et al. | 711/146 |
| 2008/0307187 A1* | 12/2008 | Schopp | 711/171 |
| 2008/0307276 A1* | 12/2008 | Bodrozic et al. | 714/719 |

OTHER PUBLICATIONS

"IBM® z/Architecture Principles of Operation", Publication No. SA22-7832-05, 6th Edition, Apr. 2007. 1,215 pages separated into 4 electronic attachments.
Ray, Joydeep, et al. "Dual Use of Superscalar Datapath for Transient-Fault Detection and Recovery". IEEE 2001. pp. 214-224.
Schwarz, E.M., "The Microarchitecture of the IBM eServer z900 Processor". IBM Research and Development. vol. 46, No. 4/5. Jul./Sep. 2002. pp. 381-395.

* cited by examiner

*Primary Examiner* — Edward Dudek, Jr.
*Assistant Examiner* — Sean D Rossiter
(74) *Attorney, Agent, or Firm* — Cantor Colburn LLP; John Campbell

(57) ABSTRACT

A method, system, and computer program product for storing result data from an external device. The method includes receiving the result data from the external device, the receiving at a system. The result data is stored into a store data buffer. The store data buffer is utilized by the system to contain store data normally generated by the system. A special store instruction is executed to store the result data into a memory on the system. The special store instruction includes a store address. The executing includes performing an address calculation of the store address based on provided instruction information, and updating a memory location at the store address with contents of the store data buffer utilizing a data path utilized by the system to store data normally generated by the system.

17 Claims, 3 Drawing Sheets

METHOD, SYSTEM AND COMPUTER PROGRAM PRODUCT FOR STORING EXTERNAL DEVICE RESULT DATA

BACKGROUND OF THE INVENTION

This invention relates generally to storing external device result data, and more particularly to utilizing a load store unit to process co-processor storage updates.

In microprocessor cores, there may be times when it is desired to allow an external logic source to update contents of the memory hierarchy without having to manage all of the coherency protocols itself. An external logic source or device can be a separate design unit, such as a co-processor (COP) that is on the same chip, or on a different chip with respect to a processor core. An external device can also be shared by multiple processor cores, with it usually handling high speed data processing and manipulation functions based on some predefined algorithm. This can become difficult due to tight timing requirements or due to complex coherency and protection rules. It would be advantageous to provide a way for an external device to write its data into the memory hierarchy or into a particular cache level, and to let existing mechanisms already in place handle the overhead for coherency management and memory protection rules.

Microprocessor architectures may not necessarily allow an external device, such as a COP, to have direct storage update capability. In particular, for a microprocessor that has millicode support (e.g., an IBM eServer z900 processor), the COP does not require, and is not likely to include, any store queue control to update storage directly. This may reduce the overall complexity in the system by taking advantage of built-in millicode capability. In this type of design, the data transfer between the processor and the COP, in general, is under control of millicode, which fetches source operand data from memory and sends it to an input buffer in the COP; reads result data from an output buffer in the COP and stores it to the target operand in memory; and reads and interprets status information from the COP. In this type of design, the result data from the COP is sent to a recovery unit (RU) where it is buffered, and then later read by millicode into a general purpose register (GPR) before being stored out to memory.

Disadvantages of this type of design include that the busing from the COP to the RU may not be desirable due to physical floorplan issues and that a special result buffer is required in the RU to store the COP result data. From a performance point of view, an additional disadvantage is that the millicode always needs to read one result register from the RU to a GPR before it can store the result data out to memory. For a typical COP operation, this may require a stream of READ RUNIT, STORE (up to 8 bytes), and INCREMENT STORE ADDRESS instructions before the COP can continue its operation again without overflowing the RU buffer. The size of the stream depends on the RU buffer size and actual size of currently available COP result.

BRIEF SUMMARY OF THE INVENTION

An exemplary embodiment includes a method for storing result data from an external device. The method includes receiving the result data from the external device, the receiving at a system. The result data is stored into a store data buffer. The store data buffer is utilized by the system to contain store data normally generated by the system. A special store instruction is executed to store the result data into a memory on the system. The special store instruction includes a store address. The executing includes performing an address calculation of the store address based on provided instruction information, and updating a memory location at the store address with contents of the store data buffer utilizing a data path utilized by the system to store data normally generated by the system.

Another exemplary embodiment includes a system for storing result data from an external device. The system includes a memory, a store data buffer, and special store instruction logic. The store data buffer receives and stores the result data from the external device, and is utilized by the system to contain store data normally generated by the system. The special store instruction logic stores the result data into the memory at a store address and performs a method. The method includes performing an address calculation of the store address based on provided instruction information. The result data is stored into the data buffer. The memory location at the store address is updated with contents of the store data buffer utilizing a data path utilized by the system to store data normally generated at the system.

A further exemplary embodiment is a computer program product for storing result data from an external device. The computer program product includes a tangible storage medium readable by a processing circuit and storing instructions for execution by the processing circuit for performing a method. The method includes receiving the result data from the external device, the receiving at a system. The result data is stored into a store data buffer. The store data buffer is utilized by the system to contain store data normally generated by the system. A special store instruction is executed to store the result data into a memory on the system. The special store instruction includes a store address. The executing includes performing an address calculation of the store address based on provided instruction information, and updating a memory location at the store address with contents of the store data buffer utilizing a data path utilized by the system to store data normally generated by the system.

BRIEF DESCRIPTION OF THE DRAWINGS

Referring now to the drawings wherein like elements are numbered alike in the several FIGURES.

DETAILED DESCRIPTION OF EXEMPLARY EMBODIMENTS

In a typical microprocessor that supports instructions that can store more than eight bytes, and possibly up to 256 bytes, a load store unit (LSU) provides a store queue and store buffer structure where it can support 256 bytes of storage update within one instruction (e.g., a store multiple instruction "STM", STMG" and a move characters instruction "MVC"). An exemplary embodiment of the present invention utilizes the existing store queue and store data buffer structure of the LSU for performing co-processor (COP) stores.

An exemplary embodiment includes a result bus directly from the COP (or other external device) into the LSU store buffer. This direct bus connection may provide more optimal busing in terms of physical wiring because the LSU is usually positioned in a processor where it can optimally communicate with components external to the processor such as a next level of cache hierarchy or an external COP. The reuse of an existing store buffer structure, which can handle up to 256 bytes per instruction, in the LSU eliminates the area required otherwise in the recovery unit (RU) for temporary storage. The direct usage of the LSU store buffer, with the provision of a new instruction (store COP special or "STCX") allows millicode to store up to 256 bytes of COP results in one instruction. This speeds up the result storing sequence and allows millicode to move on to the next operations required of the COP almost immediately.

When processing an instruction that requires work from a COP, millicode will fetch the operand and load it into the COP's input buffer. When the COP is done processing the input data and result data is loaded into the LSU's store data buffer, millicode is notified. This is typically done by having millicode spin in a loop that continuously inspects the COP status including a done flag. Millicode then inspects the amount of result data ready in the LSU (e.g., by reading a RU register). In an exemplary embodiment, the RU register gets its information about the amount of result data directly from the COP while the COP is sending the result data into the LSU. The RU register indicates how many bytes have been written into the LSU for the COP results. Millicode will first set the amount of bytes into a millicode control register (MCR), in an exemplary embodiment called MCR41, which indicates to the decode and dispatch unit (IDU) what length to utilize in the subsequent STCX instruction, according to the instruction definition. The new instruction, STCX, is issued with the desired output address generated by adding the base register (B2) and displacement (D2) values. An exemplary embodiment of the STCX instruction is depicted in FIG. 1.

Figure 1:
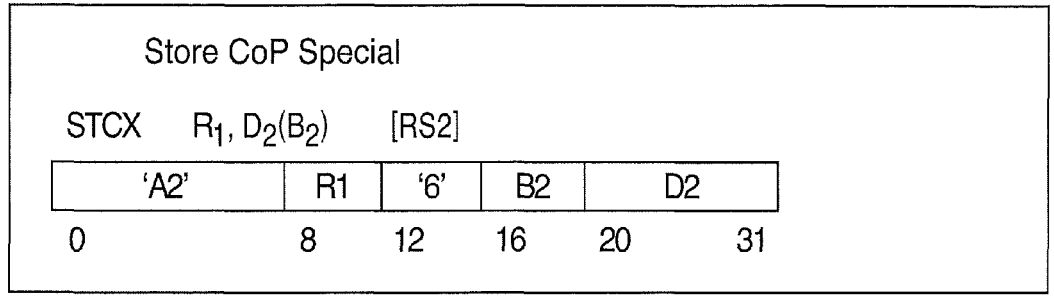
FIG. 1 is a store co-processor special instruction that may be implemented in accordance with an exemplary embodiment of the present invention.

As depicted in FIG. 1, an example of the STCX instruction is depicted using a typical z/Architecture syntax as a register-storage "RS2" instruction type. It indicates using an opcode of 'A26', as an example, and includes other parameters R1, D2, and B2. R1 field, although labeled, is undefined and is not used by the hardware. D2 is the displacement in storage (e.g., decimal or hexadecimal, absolute or symbolic) of the result data with respect to the base address. B2 is the millicode general register with the base address (e.g., decimal or hexadecimal, absolute or symbolic) of the result data. Some sample forms of the instruction include: STCX R1, D2(B2); STCX R1, 0(B2); STCX R1, D2.

In an exemplary embodiment, the number of bytes stored are specified in the XLEN field in bits 56 to 63 of MCR41 and the number of bytes actually stored is one more than this number. In an exemplary embodiment, the bytes are stored in left to right order.

During the actual dispatch of the STCX instruction, in parallel to dispatching the instruction to fixed point unit (FXU), the IDU allocates the store queue by sending a store request address to the LSU with the address generated from adding the base register value with the displacement value. During execution, the FXU treats this as a no-operation and only sends a COP store indication without any actual store data to the LSU, and then completes the instruction as if it is a one cycle instruction. The actual cache and storage update are then performed by the LSU after instruction completion.

Since the LSU store queue needs to allocate store buffer slots for regular (non-STCX) stores, the logic can become quite complicated in managing the store buffer assignments if the LSU is receiving regular store request while the COP is sending its result data to the LSU store buffer. During a typical COP operation, millicode sequence do not overlap any regular stores with COP stores, therefore a code restriction is added such that the millicode sequence will avoid any potential regular (non-STCX) store while the COP can be sending result to the LSU, which starts shortly after the COP has received input data and is instructed to proceed by millicode. To further simplify the store queue handling, the restriction may be extended to include regular store instructions that may be on a conditional branch path. The restriction of including conditional paths further helps simplify the store queue design to no longer required to handle any unintended store buffer allocation for regular stores on a wrongly predicted instruction branch path. Such unintended store buffer allocation, if not prevented, can confuse the store queue logic while these same buffers are being used to hold COP result data.

Figure 2:
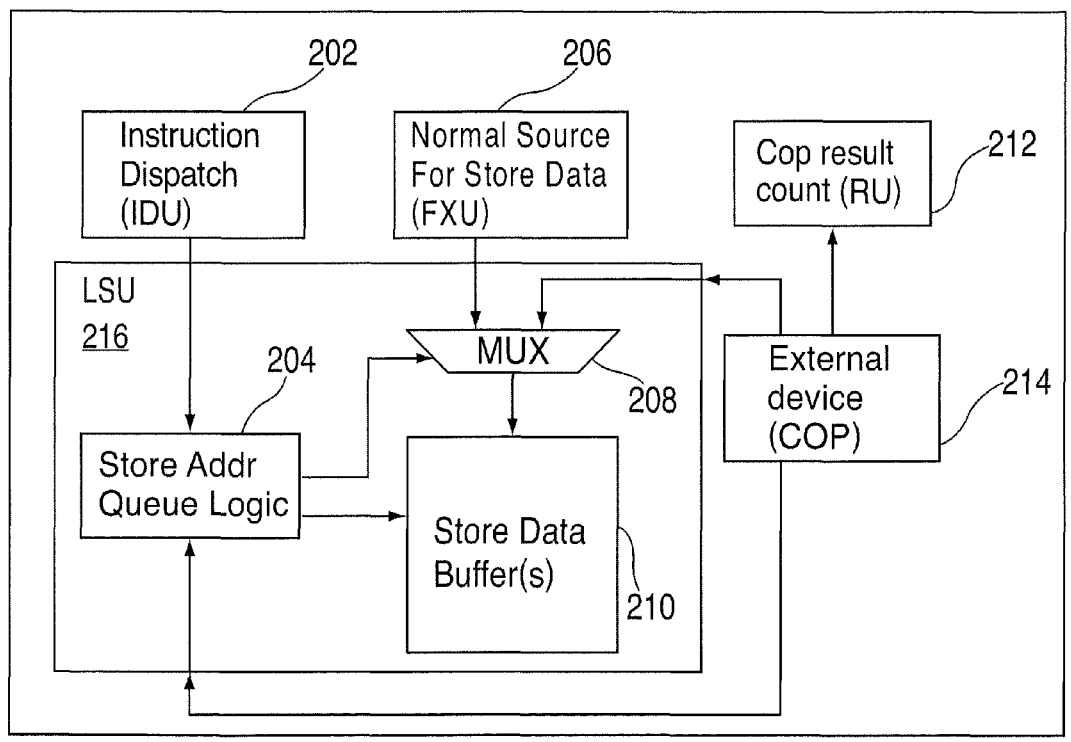
FIG. 2 is a block diagram of a system that may be implemented in accordance with an exemplary embodiment of the present invention.

FIG. 2 is a block diagram of a system that may be implemented in accordance with an exemplary embodiment of the present invention. It is a high-level diagram showing processor units that participate in the COP store operation described herein. Units that participate in the store operation include an external device 214 (e.g., a COP), a LSU 216, a RU 212, a FXU 206 and an instruction dispatch unit (IDU) 202. The LSU 216 includes the L1 data cache (not shown), store address queue logic 204, a multiplexer 208, and store data buffers 210. Only logic blocks needed to illustrate COP store are described inside the LSU 216. In an exemplary embodiment, the IDU 202 decodes instructions and dispatches requests for data associated with one or more dispatched instructions to the LSU 216, and for any storing instruction, the store address queue logic 204 will be notified of the target addresses. As depicted in FIG. 2, the normal source for store data is the FXU 206 and an alternate source for store data is the external device 214. Both sources for store data are in communication with the multiplexer 208 in the LSU 216 to select input for the store data buffers 210 in the LSU 216. In an exemplary embodiment, the store address queue logic 204 receives indications from the COP to have the COP data being multiplexed into the store data buffer instead of those from the FXU. As described earlier, by restricting regular stores during COP result communication allows a simple control to the multiplexer. Such multiplexer 314 is also shown in FIG. 3.

The COP may be handling operations where the final length of the COP store operation (number of bytes being stored) is not predictable by the processor or by millicode and will only be known by the COP after the COP has started its operation. This is taken into account in an exemplary embodiment of the present invention by having millicode dispatching the STCX after the COP has sent its data to the LSU store buffer and after the amount of result data ready has been written into the RU register. In the exemplary embodiment, the existing method for stores is that the LSU receives the target starting address for the store operation and the number of bytes to be stored at the time of dispatch for the storing instruction. Having STCX dispatched after the RU register is written with the amount of result data ready allows millicode and the IDU to have STCX look like any other storing instruction dispatch to the LSU and allows use of some existing store methods in the LSU. In addition, the COP will potentially overflow the LSU store data buffer since it isn't guaranteed the LSU store buffer is in a known state (like empty) at the time COP wants to send data. This is prevented in an exemplary embodiment by providing a control interface between the LSU 214 and the COP.

Figure 3:
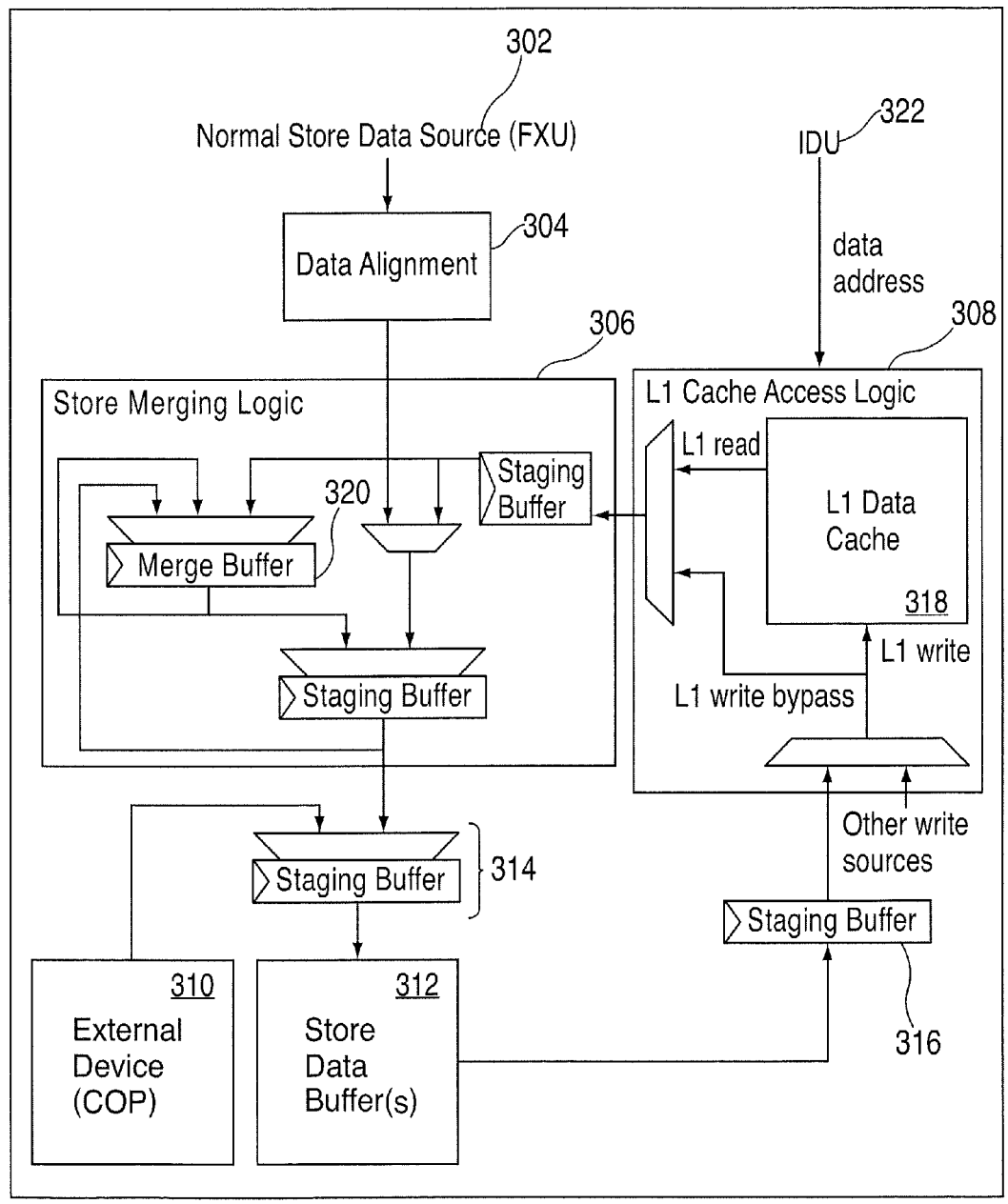
FIG. 3 is a block diagram of a data flow that may be implemented in accordance with an exemplary embodiment of the present invention.

FIG. 3 is a block diagram of a data flow that may be implemented in accordance with an exemplary embodiment of the present invention. FIG. 3 depicts both a normal store path and a COP store path that may be implemented by an exemplary embodiment of the present invention. In an exemplary embodiment, all of the components depicted in FIG. 3 except for the FXU 302 and the external device 310 are located within a LSU.

In an exemplary embodiment, all store operations in the normal store path are performed on a double word (DW) basis, and each write into the L1 is performed as a full aligned DW write. For a store-through cache design, the same DW data will also be sent to the next storage or cache hierarchy known to those skilled in the art. For such design, in order to supports non-DW aligned (or shorter than a full DW) stores, the original data corresponding to the targeted aligned DW(s) prior to the update is read out from the local L1 cache, and the new data from the store instruction is merged (performing a read-modify-write operation). In the case where the store target is a DW and is also aligned, the new data replaces the original data.

For store operations in the normal path, or basic stores, the process begins with a dispatch unit (IDU) 322 passing down a store target address, with which a DW of data will be read from the L1 cache 318. The basic L1 cache lookup mechanism is not described and is known to those skilled in the art. The data value in the cache at the specified address is saved in the merge data buffer 320. Later, when the store data is ready, it is passed from the normal store data source (e.g., the FXU 302) and through the data alignment block 304 to line up such data with the memory alignment based on the address. Once aligned, the data is passed on to the store merging logic 306 which utilizes the new data for bytes contained within the store and utilizes the data in the merge data buffer 320 for bytes not included within the store to form a complete DW that is memory aligned. Once the data is merged, it is staged out, via the staging buffer(s) 314 and written to the store data buffer 312. Once the data is in the store data buffer 312, the store can be executed (e.g., data is sent to the L1 cache access logic 308 via a staging buffer 316 and written to the L1 cache 318 with the updated values). In an exemplary embodiment, the dataflow of writing is performed by the L1 cache access logic 308. The address and location in the L1 cache where the write is targeted will be supplied by the store queue control logic (not shown in diagram) and known to those skilled in the art.

In an exemplary embodiment, the handling of the COP store differs from the normal store in a variety of manners. For example, the data in the COP store path is presented to the store data buffer 312 before the original data (or sometimes also called the background data) is acquired for the process of merging data to form an aligned DW. In an exemplary embodiment, the COP store process begins by executing a millicode sequence that will prevent any new regular store requests (non-STCX stores) from being initiated; this is done to avoid any store queue control conflicts or added control complexity. Once the millicode has loaded its input buffer, the external device 310 (e.g., a COP) can start its data processing, and eventually starts sending memory aligned data into the staging buffer 314. In an exemplary embodiment, the millicode indicates the storage alignment to the COP, which in turn sends the results to the staging buffer 314 in the LSU in a memory aligned fashion. Such pre-alignment of output data helps simplifying the LSU control logic. The COP result data is then selected (instead of data from the FXU 302) by the staging buffer 314 (e.g., via a multiplexer) to be written to the store data buffer 312 with COP indicating to LSU that result data is ready. Once all currently pending result data from the COP has been sent to the store data buffer 312, the COP sets a hardware flags such that millicode can inspect it as an indication that the COP result transmission is done and the result data is ready in the LSU. The amount of data sent to LSU is also sent to the RU such that millicode can obtain the actual value. In response to seeing the COP done indication, the millicode issues the STCX instruction described above.

Since the COP result data size can be of a variable length and the result memory location is not required to start on an aligned DW boundary, the COP result data might not cover a whole aligned DW or the beginning or ending portion of the COP result data may not cover a whole aligned DW, which, in an exemplary embodiment, is the preferred granularity of a storage update. In order to accommodate the granularity of the storage update, the bytes not being updated need to be merged with the results in the store data buffer 312 before the result data can be stored into the L1 data cache 318. To accomplish that, when the STCX instruction is dispatched, the target address of the store operation is sent from the IDU to the LSU, where the LSU will read the L1 data cache 318 and obtain the old background data (i.e., the original data currently stored at the specified address) and save it in the merge buffer 320. Once the background data registers have stored the pre-update values of the data, and the FXU 302 has completed the STCX instruction, the store data buffer(s) 312 are signaled to start an operation which looks like a write to the L1 data cache 318. The COP result DWs are read out from the store data buffer 312 and passed on through the write path towards the L1 data cache 318. In an exemplary embodiment, the result DWs are sent to a multiplexer within the L1 cache access logic 308 via a staging buffer 316.

As depicted in FIG. 3, the L1 cache access logic 308 has a mode which bypasses data from the write port to the data read port without writing to the L1 data cache 308 (labeled "L1 write bypass). This bypass data (which now contains the COP result data) is then multiplexed into a new data path and then merged with the background data which was obtained when the L1 data cache 318 was initially read during STCX dispatch and saved in merge buffer 320. Now that the background data has been obtained and merged with the COP result data, this merged data is written into the store data buffer 312 at its original location. The store data buffer 312 now has valid DW storage aligned data. The store data buffer 312 proceeds to update both the L1 data cache 318 and the higher storage hierarchy if applicable via the normal data path described above. The address and location in the L1 cache where the write is targeted will be supplied by the store queue control logic (not shown in diagram) and known to those skilled in the art.

Figure 4:
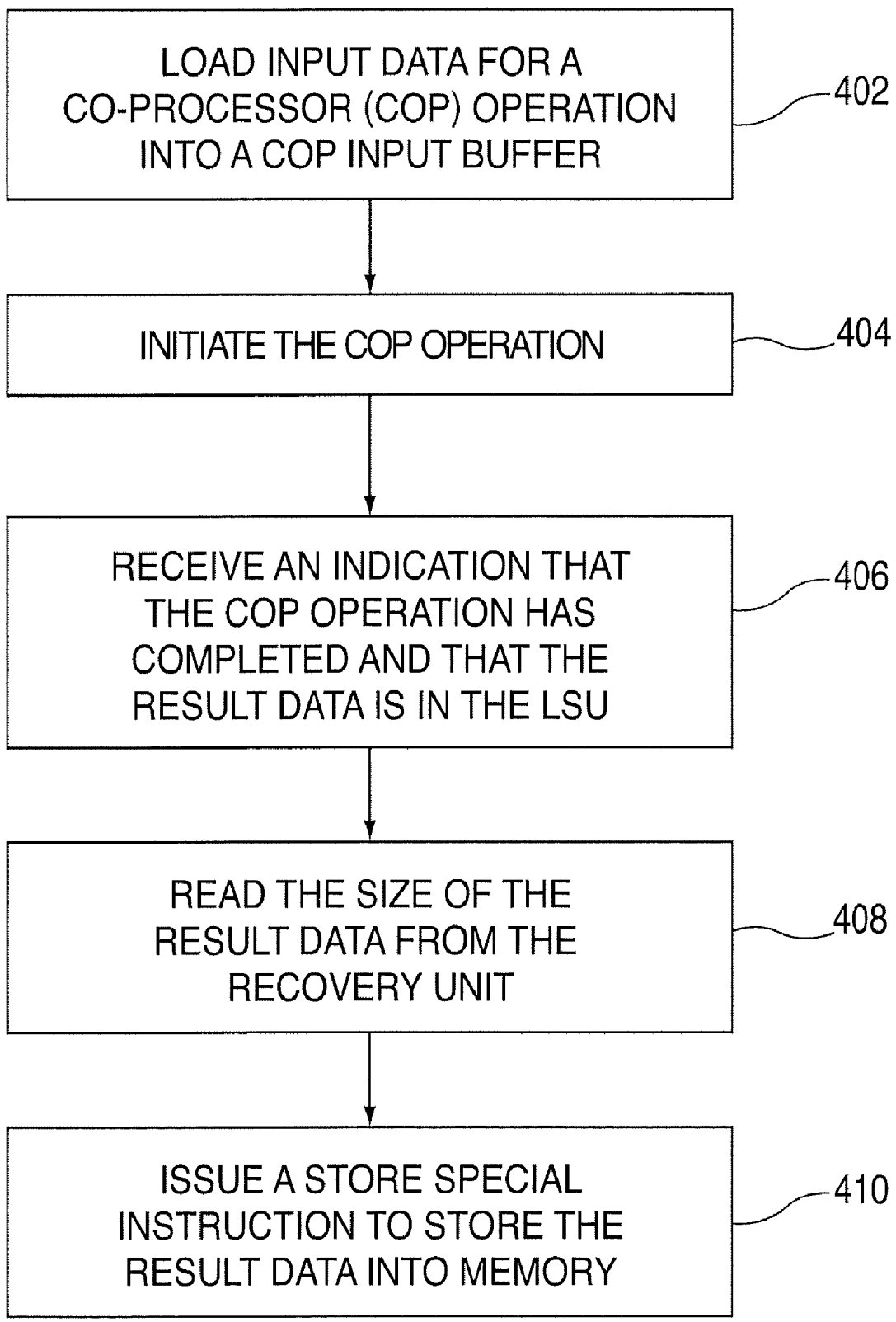
FIG. 4 depicts a process for storing co-processor result data that may be implemented in accordance with an exemplary embodiment of the present invention.

FIG. 4 depicts a process for storing COP result data that may be implemented in accordance with an exemplary embodiment of the present invention in a millicode capable machine. At block 402, input data for a COP operation is loaded into a COP input buffer by a millicode routine. At block 404, the COP operation, where the COP will start processing its input data and then producing result data, is initiated by the millicode. At block 406 an indication is received by the millicode that the current COP operation has completed and that the result data is in the LSU (e.g., in the store data buffer 312). At block 408, the size of the result data is read from a predefined register in the RU, and at block 410, a STCX instruction is issued to cause the result data to be stored into memory, including the cache hierarchy, in the manner described herein above.

A COP is one example of an external device that may write data directly to the LSU in accordance with an exemplary embodiment of the present invention. Exemplary embodiments also support other types of external devices writing directly to the LSU, such as, but not limited to a graphics accelerator.

Technical effects and benefits include providing a result bus directly from the COP into the LSU store data buffer. As described previously, the direct bus connection may provide more optimal busing in terms of physical wiring. In addition, the reuse of an existing store data buffer structure saves on storage requirements. Further performance benefits are achieved by allowing up to 256 bytes of COP result data to be stored in one single cycle instruction.

As described above, the embodiments of the invention may be embodied in the form of computer-implemented processes and apparatuses for practicing those processes. Embodiments of the invention may also be embodied in the form of computer program code containing instructions embodied in tangible media, such as floppy diskettes, CD-ROMs, hard drives, or any other computer-readable storage medium, wherein, when the computer program code is loaded into and executed by a computer, the computer becomes an apparatus for practicing the invention. The present invention can also be embodied in the form of computer program code, for example, whether stored in a storage medium, loaded into and/or executed by a computer, or transmitted over some transmission medium, such as over electrical wiring or cabling, through fiber optics, or via electromagnetic radiation, wherein, when the computer program code is loaded into and executed by a computer, the computer becomes an apparatus for practicing the invention. When implemented on a general-purpose microprocessor, the computer program code segments configure the microprocessor to create specific logic circuits.

While the invention has been described with reference to exemplary embodiments, it will be understood by those skilled in the art that various changes may be made and equivalents may be substituted for elements thereof without departing from the scope of the invention. In addition, many modifications may be made to adapt a particular situation or material to the teachings of the invention without departing from the essential scope thereof. Therefore, it is intended that the invention not be limited to the particular embodiment disclosed as the best mode contemplated for carrying out this invention, but that the invention will include all embodiments falling within the scope of the appended claims. Moreover, the use of the terms first, second, etc. do not denote any order or importance, but rather the terms first, second, etc. are used to distinguish one element from another.

The invention claimed is:

1. A method for storing data, the method comprising:
receiving data at a load store unit (LSU) on a processor, the receiving from a device external to the processor via a bus directly connected to the device and to the LSU, the LSU comprising a store data buffer, a memory, and a store data path for storing data generated by the processor into the memory in response to a store instruction;
receiving a size of the data;
storing, using the size of the data as input, the data received from the device external to the processor into the store data buffer;
obtaining from memory for execution, a special store instruction; and
executing, using the size of the data as input, the special store instruction to store the data received from the device external to the processor into the memory, the special store instruction including a store address, and the executing comprising updating the memory at the store address with contents of the store data buffer, the updating performed using the store data path in the LSU.

2. The method of claim 1 wherein the device is a co-processor.

3. The method of claim 1 wherein the memory consists of a cache hierarchy with at least one level of cache.

4. The method of claim 1 wherein the size is received from a register in a recovery unit.

5. The method of claim 1 wherein during the storing and the executing further restricting executing instructions that can store but are not special store instructions from being initiated until the executing has completed.

6. The method of claim 1 further comprising loading input data for an external device operation into an external device input buffer, initiating the external device operation at the device, and receiving an indication that the external device operation has completed and that the result data from the external device operation is available to the processor.

7. The method of claim 1, wherein the executing the special store instruction further comprises prior to the updating:
reading a current value at the store address;
storing the current value into a merge buffer utilized by the processor to store data generated by the processor;
merging the result data in the store data buffer with the current value in the merge buffer; and
storing the result of the merging into the store data buffer.

8. A system for storing data, the system comprising a processor:
the processor comprising:
a load store unit (LSU) comprising a memory, a store data buffer, and a store data path for storing data generated by the processor into the memory in response to a store instruction, the processor configured to perform a method comprising:
receiving data at the LSU, the receiving from a device external to the processor via a bus directly connected to the device and to the LSU;
receiving a size of the data;
storing, using the size of the data as input, the data received from the device external to the processor into the store data buffer;
obtaining from memory for execution a special store instruction; and
executing, using the size of the data as input, the special store instruction to store data received from the device external to the processor into the memory, the special store instruction including a store address, and the executing comprising updating the memory at the store address with contents of the store data buffer, the updating performed using the store data path in the LSU.

9. The system of claim 8 wherein the device is a co-processor.

10. The system of claim 8 wherein the memory is a cache.

11. The system of claim 8 wherein the method further comprises prior to the executing a special store instruction, executing instructions to prevent any store instructions that are not special store instructions from being initiated until the executing a special store instruction has completed.

12. The system of claim 8 wherein the method further comprises loading input data for an external device operation into an external device input buffer, initiating the external device operation at the device, and receiving an indication that the external device operation has completed and that the result data from the external device operation is available.

13. The system of claim 8 further comprising a merge buffer, wherein the storing the result data comprises:
reading a current value at the store address;

storing the current value into the merge buffer;

merging the data in the store data buffer with the current value in the merge buffer; and storing the result of the merging into the store data buffer.

14. A computer program product for storing data, the computer program product comprising:

a tangible non-transitory storage medium readable by a processing circuit and storing instructions for execution by the processing circuit for performing a method comprising:

receiving data at a load store unit (LSU) on a processor, the receiving from a device external to the processor via a bus directly connected to the device and to the LSU, the LSU comprising a store data buffer, a memory, and a store data path for storing data generated by the processor into the memory in response to a store instruction;

receiving a size of the data;

storing, using the size of the data as input, the data received from the device external to the processor into the store data buffer;

obtaining from memory for execution, a special store instruction; and executing, using the size of the data as input, the special store instruction to store the data received from the device external to the processor into the memory, the special store instruction including a store address, and the executing comprising updating the memory at the store address with contents of the store data buffer, the updating performed using the store data path in the LSU.

15. The computer program product of claim 14 wherein the device is a co-processor.

16. The computer program product of claim 14 wherein the memory is a cache.

17. The computer program product of claim 14 wherein the processor is a microprocessor.

* * * * *